United States Patent
Zou

(10) Patent No.: US 11,530,305 B2
(45) Date of Patent: Dec. 20, 2022

(54) DUAL TEMPERATURE CURABLE SILICONE COMPOSITIONS, METHODS OF MANUFACTURE, AND ARTICLES PREPARED THEREFROM

(71) Applicant: Rogers Corporation, Chandler, AZ (US)

(72) Inventor: Jianhua Zou, Newark, DE (US)

(73) Assignee: ROGERS CORPORATION, Chandler, AZ (US)

( * ) Notice: Subject to any disclaimer, the term of this patent is extended or adjusted under 35 U.S.C. 154(b) by 0 days.

(21) Appl. No.: 17/112,132

(22) Filed: Dec. 4, 2020

(65) Prior Publication Data

US 2021/0087397 A1    Mar. 25, 2021

Related U.S. Application Data

(62) Division of application No. 15/561,272, filed as application No. PCT/US2016/024607 on Mar. 29, 2016, now abandoned.

(60) Provisional application No. 62/141,019, filed on Mar. 31, 2015.

(51) Int. Cl.
| | |
|---|---|
| *C08J 3/24* | (2006.01) |
| *C08L 83/04* | (2006.01) |
| *C08G 77/08* | (2006.01) |
| *C08G 77/12* | (2006.01) |
| *C08G 77/20* | (2006.01) |
| *C09J 183/14* | (2006.01) |
| *C09J 183/04* | (2006.01) |
| *B29C 43/24* | (2006.01) |
| *B29K 83/00* | (2006.01) |
| *B29K 105/00* | (2006.01) |

(52) U.S. Cl.
CPC .............. *C08J 3/243* (2013.01); *C08G 77/08* (2013.01); *C08G 77/12* (2013.01); *C08G 77/20* (2013.01); *C08L 83/04* (2013.01); *C09J 183/04* (2013.01); *C09J 183/14* (2013.01); *B29C 43/24* (2013.01); *B29K 2083/00* (2013.01); *B29K 2105/0014* (2013.01)

(58) Field of Classification Search
CPC ...... C08L 83/04; C09D 183/04; C09J 183/04; C08J 3/243
See application file for complete search history.

(56) References Cited

U.S. PATENT DOCUMENTS

| | | | |
|---|---|---|---|
| 4,020,014 A | 4/1977 | Service et al. | |
| 4,329,275 A | 5/1982 | Hatanaka et al. | |
| 4,539,357 A | 9/1985 | Bobear | |
| 4,929,669 A | 5/1990 | Jensen | |
| 5,006,372 A * | 4/1991 | Wolfer | C08K 5/14 427/387 |
| 5,160,670 A | 11/1992 | Hamada et al. | |
| 5,321,058 A | 6/1994 | Fuchigami et al. | |
| 5,717,009 A | 2/1998 | Matsushita et al. | |
| 5,863,625 A | 1/1999 | Chiou | |
| 6,387,487 B1 | 5/2002 | Greenberg et al. | |
| 6,639,008 B2 | 10/2003 | Lewis et al. | |
| 7,153,583 B2 | 12/2006 | Azechi | |
| 2011/0104470 A1* | 5/2011 | Anderson | C09J 183/04 428/221 |
| 2014/0288197 A1* | 9/2014 | Shimakawa | C08J 3/247 521/50.5 |
| 2017/0355804 A1* | 12/2017 | Fujisawa | C09J 151/085 |
| 2020/0010621 A1* | 1/2020 | Suzumura | C08G 77/50 |

FOREIGN PATENT DOCUMENTS

| | | |
|---|---|---|
| EP | 0465906 A2 | 1/1992 |
| EP | 2374847 A1 | 10/2011 |
| JP | S5298051 A | 8/1977 |
| JP | S55133451 A | 10/1980 |
| JP | S55137162 A | 10/1980 |
| JP | H0462012 A | 2/1992 |
| JP | H05065414 A | 3/1993 |
| JP | H08253684 A | 10/1996 |
| JP | H10182972 A | 7/1998 |
| JP | 10219197 | 8/1998 |
| JP | 2005-068273 | * 3/2005 |
| JP | 2006137787 A | 6/2006 |
| JP | 2007191629 A | 8/2007 |
| JP | 2007302829 A | 11/2007 |
| JP | 2014224193 A | 12/2014 |
| KR | 100181705 | 5/1999 |
| KR | 1020110113154 | 10/2011 |

OTHER PUBLICATIONS

Machine translation of JP 2005-68273 (no date).*
International Search Report for PCT/US2016/024607 dated Jul. 1, 2016, 6 pages.
Product Data Sheet for Elastosil AUX PT1 (no date).
Written Opinion of the International Searching Authority for PCT/US2016/024607 dated Jul. 1, 2016, 5 pages.

* cited by examiner

*Primary Examiner* — Marc S Zimmer

(74) *Attorney, Agent, or Firm* — Cantor Colburn LLP

(57) ABSTRACT

Dual temperature curable silicone compositions, articles made from such compositions, and methods for the manufacture and use thereof. In particular, a dual temperature curable silicone composition is manufactured from a composition comprising a vinyl silicone; a silicone hydride-containing crosslinker; a platinum-containing catalyst; and a peroxide catalyst.

18 Claims, No Drawings

DUAL TEMPERATURE CURABLE SILICONE COMPOSITIONS, METHODS OF MANUFACTURE, AND ARTICLES PREPARED THEREFROM

CROSS-REFERENCE TO RELATED APPLICATION

The application is a divisional application of U.S. Ser. No. 15/561,272, filed on Mar. 29, 2016, which is a national stage application of PCT/US2016/024607 filed Mar. 29, 2016, which claims priority to U.S. Provisional Application No. 62/141,019 filed Mar. 31, 2015, of which are hereby incorporated herein by reference in their entirety.

BACKGROUND

This disclosure relates generally to dual temperature curable silicone compositions, articles made from such compositions, and methods for the manufacture and use thereof.

Silicone compositions are used in a variety of technologies. There is a need for silicone compositions that have improved properties such as ease of formulation, and flexibility in tailoring the composition properties for a desired use. There is a particular need for compositions having improved handling characteristics before cure of the composition is complete.

SUMMARY

Disclosed herein is a dual temperature curable silicone composition, comprising 100 parts by weight of a vinyl silicone; 0.05-10 parts by weight of a silicone hydride-containing crosslinker; 0.5-5 parts by weight of a platinum-containing catalyst; and 0.2-5 parts by weight of a peroxide catalyst. Also disclosed herein is a method of fully curing a dual temperature curable silicone composition, comprising providing a silicone composition comprising a vinyl silicone; a silicone hydride-containing crosslinker; a platinum-containing catalyst; and a peroxide catalyst; exposing the silicone composition to a first temperature to activate the platinum catalyst but not the peroxide catalyst, to form a semi-cured composition; and heating the semi-cured composition to a second temperature sufficient to activate the peroxide catalyst, to form a fully cured composition. Also disclosed herein is a method of semi-curing a dual temperature curable silicone composition, comprising: providing a dual temperature curable silicone composition comprising a vinyl silicone; a silicone hydride-containing crosslinker; a platinum-containing catalyst; and a peroxide catalyst; exposing the silicone composition to a first temperature to activate the platinum catalyst but not the peroxide catalyst to form a semi-cured composition. Also disclosed herein is a method of forming an article comprising shaping a silicone composition comprising vinyl silicone; a silicone hydride-containing crosslinker; a platinum-containing catalyst; and a peroxide catalyst to form an uncured article; exposing the uncured article to a first temperature to activate the platinum catalyst but not the peroxide catalyst, to provide a semi-cured article; and heating the semi-cured article to a second temperature sufficient to activate the peroxide catalyst, to form a fully cured article.

The above described and other features are exemplified by the following detailed description.

DETAILED DESCRIPTION OF THE EMBODIMENTS

Described herein are dual temperature curable silicone compositions, articles made from such compositions, and methods for the manufacture and use thereof. In particular, the inventors hereof have developed silicone compositions that can be partially or semi-cured at a lower temperature, and fully cured at a higher temperature. In particular, the dual temperature curable silicone composition is manufactured from a composition comprising a vinyl silicone; a silicone hydride-containing crosslinker; a platinum-containing catalyst; and a peroxide catalyst. A first, lower cure temperature activates the platinum-containing catalyst, and a second, higher cure temperature activates the peroxide catalyst and fully cures the composition. In an especially advantageous feature, the compositions can be shaped, semi-cured, and then stored in the semi-cured form and fully cured at a later time. For example, use of a semi-cure provides an article that can be easily repositioning during subsequent manufacturing steps, for example before lamination. Thus, semi-cure can be used to reduce tack of the composition. The green strength of the semi-cure composition can be greater than the uncured composition. The semi-cure can also increase the "uncured bond strength" between the silicone composition and an adherend.

The methods of curing a dual temperature curable silicone composition are useful not only for forming layers and coatings, but also for composite materials. The dual temperature curable silicone compositions can be used as an adhesive, for example to bond to one or more substrates or substances such as the silicone composition itself, a metal, or a polymer such as polyimide. It has been found that the dual temperature curing system described provides flexibility in processing, such as the ability to use the semi-cured form to bond to a substrate and then continuing to the fully cured form which can bond to a different substance or the composition itself. In an embodiment, the semi-cured form can bond to polyimide or another substrate, for example. In an embodiment, the fully cured form can bond to a metal foil.

The dual temperature curable silicone compositions, articles prepared therefrom, and methods of manufacturing are further illustrated by the following embodiments, which are non-limiting.

The dual temperature curable silicone composition comprises, based on the total weight of the composition: 100 parts by weight of a vinyl silicone; 0.05-10 parts by weight of a silicon hydride-containing crosslinker; 0.5-5 parts by weight of a platinum-containing catalyst; and 0.2-5 parts by weight of a peroxide catalyst. The viscosity of the dual temperature curable silicone composition can vary widely before cure, for example 10,000 mPa·sec at 25° C. to 500,000 mPa·sec at 25° C.

The vinyl silicone is siloxane having one or more vinyl groups or substituted vinyl group bonded to a silicon atom. As used herein, a vinyl group is a group having the formula —CH=CH$_2$, and a "substituted vinyl group" has the formula —CH=CR$_2$, where the R groups can be independently hydrogen or C$_{1-6}$ alkyl groups. The vinyl silicone can comprise a polydialkyl siloxane having more than one vinyl group or substituted vinyl group bonded to silicon. In an embodiment, the vinyl silicone comprises a polydiorganosiloxane functionalized with a terminal —Si (R$^1$R$^2$)—CH=CH$_2$ group, wherein R$^1$ and R$^2$ are each independently hydrogen or C$_1$-C$_6$ alkyl groups, preferably a terminal —Si(Me)$_2$-CH=CH$_2$ group, for example a dimethylvinyl-terminated dimethylsiloxane. A vinyl group or substituted vinyl group can be present at one or both termini of the vinyl silicone. Alternatively, or in addition, the vinyl or substituted vinyl group can be bonded to a non-terminal silicon atom of the vinyl silicone.

In an embodiment, the vinyl silicone is of Formula (I)

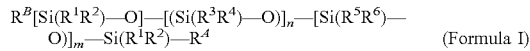

(Formula I)

wherein n has an average value of 1 to 200, preferably 50 to 150, more preferably 100 to 150; m is 0 or has an average value of 1 to 20,000, preferably 10,000 to 20,000, more preferably 10,000 to 15,000; $R^A$, $R^B$, $R^1$, $R^2$, $R^3$, $R^4$, $R^5$ and $R^6$ are each independently phenyl or $C_1$-$C_6$ alkyl; and at least one of $R^A$, $R^B$, $R^3$ or $R^4$ has the formula —CH=$CR^F R^G$, where $R^F$ and $R^G$ are each independently hydrogen or $C_1$-$C_6$ alkyl. In an embodiment, m and n are selected to provide a viscosity of the vinyl silicone of 10,000 mPa·sec to 500,000 mPa·sec at 25° C. In Formula (I), the $R^A$, $R^B$, $R^1$, $R^2$, $R^3$, $R^4$, $R^5$ and $R^6$ groups that are not vinyl can be an alkyl group such as methyl, ethyl, or propyl. Preferably, the $R^A$, $R^B$, $R^1$, $R^2$, $R^3$, $R^4$, $R^5$ and $R^6$ groups in Formula (I) that are not vinyl are methyl. In an embodiment, in Formula (I), $R^1$ and $R^2$ are both methyl groups. The vinyl concentration in the vinyl silicone can be 0.001 to 1 mole percent.

The silicon hydride-containing crosslinker includes one or more groups containing a hydrogen atom bonded to a silicon atom (—Si—H). In an embodiment, the silicone hydride-containing crosslinker is a compound comprising silicon-bonded hydride groups at one or more terminal ends thereof. Alternatively, or in addition, one or more silicon-bonded hydride groups can be present along the backbone of the crosslinker. In an embodiment, the silicone hydride-containing crosslinker comprises two or more silicon-bonded hydrogen atoms, or three or more silicon-bonded hydrogen atoms. In an embodiment, the silicone hydride-containing crosslinker contains two or three silicon-bonded hydrogen atoms, and up to eight silicon-bonded hydrogen atoms per molecule.

In an embodiment, the silicone hydride-containing crosslinker is of Formula (II):

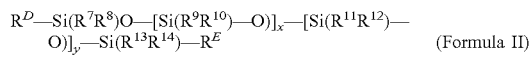

(Formula II)

wherein at least one of $R^D$, $R^E$, $R^7$, $R^8$, $R^9$, $R^{10}$, $R^{11}$, $R^{12}$, $R^{13}$ and $R^{14}$ is hydrogen; and the others of $R^D$, $R^E$, $R^7$, $R^8$, $R^9$, $R^{10}$, $R^{11}$, $R^{12}$, $R^{13}$ and $R^{14}$ are each independently phenyl or $C_1$-$C_6$ alkyl; x has an average value of 1 to 300, preferably 100 to 300, more preferably 150 to 250; y is 0 or has an average value of 1 to 300, preferably 100 to 300, more preferably 150 to 250.

In an embodiment, in the silicon hydride-containing crosslinker of Formula II, both of $R^D$ and $R^E$ are hydrogen and $R^7$, $R^8$, $R^9$, $R^{10}$, $R^{11}$, $R^{12}$, $R^{13}$ and $R^{14}$ are phenyl or methyl, preferably methyl. In an embodiment, in the silicon hydride-containing crosslinker of Formula II, y is 0; both of $R^D$ and $R^E$ are methyl; $R^9$ is hydrogen and $R^7$, $R^8$, $R^{10}$, $R^{13}$, and $R^{14}$ are methyl. In an embodiment, in the silicon hydride-containing crosslinker of Formula II, both of $R^D$ and $R^E$ are methyl; $R^9$ is hydrogen and $R^7$, $R^8$, $R^9$, $R^{10}$, $R^{11}$, $R^{12}$, $R^{13}$ and $R^{14}$ are methyl. Further, in Formula (II), x and y are adjusted to provide the desired number of silicon hydride groups and the desired viscosity in the silicon hydride-containing crosslinker. Generally, any silicone hydride-containing crosslinker useful in heat-cure systems can be used in the compositions described here. Examples of such silicone hydride-containing crosslinkers include those available from commercial sources.

In some embodiments, the silicone hydride-containing crosslinker has a hydride content ranging from 0.02 to 10 percent by weight and a viscosity ranging from 10 to 10,000 centipoise at 25° C.

The platinum-containing catalyst is any suitable platinum-containing catalyst. In an embodiment, the platinum-containing catalyst comprises a Pt(0) complex, a Pt(II) complex, a Pt(IV) complex or a combination comprising at least one of the foregoing. The platinum-containing catalyst can be a finely divided metallic platinum, platinum on a finely divided carrier such as alumina, compounds of platinum such as chloroplatinic acid, or complexes of platinum.

Some examples of platinum-containing catalysts comprising a Pt(0) complex include: bis-(1,3-divinyl-1,1,3,3-tetramethyldisiloxane) platinum (0); (2,4,6,8-tetramethyl-2,4,6,8-tetravinylcyclotetrasiloxane) platinum(0); ethylenebis(triphenylphosphine)platinum(0), bis(tri-tert-butylphosphine) platinum(0); and tetrakis(triphenylphosphine) platinum(0). Some examples of platinum-containing catalysts comprising a Pt(II) complex include: dimethyl (1,5-cyclooctadiene)platinum(II); trans-dichlorobis(triethylphosphine) platinum(II); dichlorobis(ethylenediamine) platinum(II); dichloro(1,5-cyclooctadiene) platinum(II); platinum(II) chloride; platinum(II) bromide; platinum(II) iodide; trans-platinum(II)diamine dichloride; dichloro(1,2-diaminocyclohexane) platinum(II); and ammonium tetrachloroplatinate(II). Some examples of platinum-containing catalysts comprising a Pt(IV) complex include: dihydrogen hexachloroplatinate (IV) hexahydrate; platinum(IV) oxide hydrate; and ammonium hexachloroplatinate(IV). The platinum-containing catalyst can be in the form of a dispersion, a powder, or a solubilized complex.

The platinum-containing catalyst is selected to be activated at a lower temperature than the peroxide catalyst. In an embodiment, the platinum-containing catalyst is activated at a temperature at least 25° C. lower, or at least 40° C. lower, at least 50° C. lower, or at least 60° C. lower than the peroxide catalyst. In an embodiment, the platinum-containing catalyst is activated at room temperature, preferably between 18-28° C., more preferably between 20-26° C.

A wide variety of peroxide catalysts can be used, for example an inorganic or organic peroxide (such as an aliphatic, aromatic, or mixed aliphatic-aromatic peroxide), or a combination comprising at least one of the foregoing. In an embodiment, the peroxide catalyst comprises benzoyl peroxide, di-t butyl peroxide, 2,4-dichlorobenzoyl peroxide, or 2,5-bis(t-butylperoxy)-2,5-dimethylhexane. In an embodiment, the peroxide catalyst is 2,4-dichlorobenzoyl peroxide.

The relative amount of platinum-containing catalyst and peroxide catalyst in the curable silicone composition are selected based on the reactivity of the components and to provide the desired cure state, including semi-cured and fully cured state, and the desired curing conditions, including temperature and desired length of cure of each cure step. For example, the platinum-containing catalyst and peroxide catalyst can be present in a weight percent ratio of 0.001:1 to 1:1, for example 0.005:1 to 0.8:1, or 0.01:1 to 0.5:1.

In an embodiment, the dual temperature curable silicone composition further comprises one or more components known for use in the formulation of curable silicones. For example, the dual temperature curable silicone compositions can further comprise a solvent. In an embodiment, the solvent comprises one or more of an organic solvent and water. In an embodiment, the solvent is one or more organic solvents. The solvent can be any suitable solvent or solvent mixture that allows the desired reactions to occur, for example an alcohol (e.g., a $C_1$-$C_4$ alcohol), water, an aromatic solvent such as xylene, or a combination comprising the foregoing. In an embodiment, the alcohol is present in an amount from 1-100 parts by weight, based on the total weight of the non-solvent components of the composition; the water is present from 1-20 parts by weight, based on the total weight of the non-solvent components of the composition; and the aromatic solvent is present from 200-2000 parts by weight based on the total weight of the non-solvent components of the composition.

Other components or additives, such as fillers, inhibitors, dispersing aids, adhesion promotors, dyes, plasticizers, heat stabilizers, pigments, antioxidants, or the like, or a combination comprising at least one of the foregoing can be present in the curable silicone compositions. In an embodiment, the dual temperature curable silicone composition further comprises a heat stabilizer. Heat stabilizers can be used to improve the heat resistance of cured silicone compositions. The amount of heat stabilizer used is sufficient to provide the desired level of heat stability, but not so high to cause undesirable physical properties of the composition. In an embodiment, the heat stabilizer is present in the curable silicone composition at 0.05 to 10 parts by weight of the composition. Heat stabilizers are known in the art, and can be, for example, carbon black, calcium carbonate, a metal oxide such as iron oxide, zinc oxide, or a combination comprising at least one of the foregoing.

The compositions can be formulated by any suitable means, including standard mixing equipment or by hand. A convenient method for preparing the curable silicone compositions is mixing the different components to homogeneity and removing air by degassing under vacuum. The compositions can then be stored until use. Alternatively, the compositions can be mixed separately into an A and B formulation for mixing immediately prior to use. For example the vinyl siloxane can be stored separately from the platinum catalyst and silicon-hydride containing component.

In a method of use of the curable silicone composition, the composition is heated or otherwise exposed to a first temperature sufficient to activate the platinum-containing catalyst for a sufficient amount of time to achieve the desired level of curing to form a semi-cured composition. In an embodiment, exposing refers to application of heat or heating, including allowing the composition or article to be at room temperature. In an embodiment, the first temperature is room temperature. In an embodiment, the semi-cured composition is partially cured by exposing the composition to room temperature for a sufficient amount of time for the desired level of cure to occur. In an embodiment, the first temperature is 21° C. to below 100° C. In another embodiment, the first temperature is 21° C. to below 50° C. In an embodiment, the first temperature is held for 10 to 240 minutes, or from 100 to 600 minutes. The specific temperatures and times depend on the particular platinum-containing and organic catalysts selected, the reactivity of the components of the curable composition, and the degree of cure desired. As used herein, "semi-cured" includes a wide variety of cured states, provided that the cure is not complete. For example, a "semi-cured" composition can be a silicone composition wherein 5 to 85% of the reactive vinyl groups have been reacted, or 10 to 70% of the reactive vinyl groups have reacted, or 10 to 50% of the vinyl groups have reacted. In a preferred embodiment, the degree of cure is selected to provide a semi-cured composition that is B-staged as that term is used in the art. Thus, in a preferred embodiment, the uncured compositions are shaped, for example cast or calendered to form a layer; and then partially cured to provide mechanical integrity to the shape so that it can be readily manipulated for storage or subsequent use, i.e., subsequent manufacturing steps. Such steps can include storage between release layers, or further layering for, e.g., lamination to other layers.

After such steps (if any), the semi-cured composition is then fully cured by heating the semi-cured composition to a second temperature sufficient to activate the peroxide catalyst. In an embodiment, the second temperature is 70° C. to 250° C., for example 100° C. to 250° C., for example 125° C. to 220° C., or 130° C. to 200° C. The second cure can be conducted, for example, for 10 to 300 minutes. Methods of heating a silicone composition and curing a silicone composition include press-curing, hot-air curing, oven baking, and lamination.

Thus, in some embodiments a method of semi-curing or fully curing a dual temperature curable silicone composition comprises providing a silicone composition comprising a vinyl silicone, a silicone hydride-containing crosslinker, a platinum-containing catalyst, and a peroxide catalyst; exposing the uncured composition to a first temperature (e.g., below 100° C., preferably below 50° C.) to activate the platinum catalyst but not the peroxide catalyst, to form a semi-cured composition. Heating the semi-cured composition to a second temperature sufficient to activate the peroxide catalyst forms a fully cured composition. In an embodiment, the method further comprises forming the uncured or semi-cured silicone composition into a desired shape. For example, the uncured composition can be shaped, and semi-cured sufficiently to retain the shape (B-staged). Alternatively, the uncured composition can be semi-cured; and then shaped prior to full cure, which also provides a B-stage article.

Specifically, in some embodiments, a method of forming a semi-cured article comprises providing a silicone composition comprising a vinyl silicone, a silicone hydride-containing crosslinker, a platinum-containing catalyst, and a peroxide catalyst; exposing the uncured composition to a first temperature (e.g., below 100° C., preferably below 50° C.) to activate the platinum catalyst but not the peroxide catalyst, to provide a semi-cured composition; and shaping the semi-cured composition to provide a shaped, semi-cured article. The shaping can be by casting or calendering onto a substrate or a release layer.

In other embodiments, a method of forming a semi-cured article comprises shaping a silicone composition comprising a vinyl silicone, a silicone hydride-containing crosslinker, a platinum-containing catalyst, and a peroxide catalyst to form a shaped, uncured composition; and exposing the shaped uncured composition to a first temperature (e.g., below 100° C., preferably below 50° C., or storing at room temperature) to activate the platinum catalyst but not the peroxide catalyst, to provide a shaped, semi-cured article. The shaping can be by casting or calendering onto a substrate or a release layer. Optionally, the semi-cured article can subjected to an additional manufacturing step, e.g., layering with another layer.

In yet other embodiments, a method of forming an article comprises providing a silicone composition comprising a vinyl silicone, a silicone hydride-containing crosslinker, a platinum-containing catalyst, and a peroxide catalyst; exposing the uncured composition to a first temperature (e.g., below 100° C., preferably below 50° C.) to activate the platinum catalyst but not the peroxide catalyst, to provide a semi-cured composition; shaping the semi-cured composition (e.g., by casting or calendering onto a substrate or a release layer) to provide a semi-cured article; and heating the semi-cured composition to a second temperature sufficient to activate the peroxide catalyst, to form a fully cured article. Optionally, the semi-cured article can subjected to an additional manufacturing step, e.g., layering with another layer; and the second temperature can be achieved by lamination.

In still other embodiments, a method of forming an article comprises shaping a silicone composition comprising a vinyl silicone, a silicone hydride-containing crosslinker, a platinum-containing catalyst, and a peroxide catalyst to form an uncured article; exposing the uncured article to a first temperature (e.g., below 100° C., preferably below 50° C.) to activate the platinum catalyst but not the peroxide catalyst, to provide a semi-cured article; and heating the semi-cured article to a second temperature sufficient to activate the peroxide catalyst, to form a fully cured article. Optionally, the semi-cured article can subjected to an additional manufacturing step, e.g., layering with another layer; and the second temperature can be achieved by lamination.

The semi-cured and fully cured silicone compositions made by the methods described can be used in a variety of applications. In an embodiment, the semi-cured or fully cured composition provides adhesion to two adherends. For example, the uncured composition can be cast or calendered onto a substrate (i.e., a first adherend) to form a layer, semi-cured, and then contacted with the second adherend, and the composition fully cured, for example by lamination.

In some embodiments, a primer can be used to enhance adhesion to a substrate or first adherend. Such primers are known, and include, for example, multi-functional compounds reactive with the silicone and with the substrate, for example vinyl group- or substituted vinyl group-containing silanes. Such compounds include, for example, a vinyl tris(alkoxyalkoxy)silane. In an embodiment, the vinyl tris(alkoxyalkoxy)silane is present in an amount of 2-20 parts by weight, based on the total weight of the composition. In an embodiment, the vinyl tris(alkoxyalkoxy)silane is vinyl tris[($C_1$-$C_6$alkoxy)($C_1$-$C_6$alkoxy)]silane. In an embodiment, the vinyl tris(alkoxyalkoxy)silane is vinyl tris(2-methoxyethoxy) silane. The primers can be applied by methods known in the art, for example dipping or coating. In some embodiments, any primer layer has a thickness from 1 µm (0.04 mil) to 2000 µm (80 mil). The thickness of each of the primer layers can vary depending on the adherends. For example the primer layers can have a thickness of 1 to 2,000 micrometers (µm) (0.04 to 80 mil), and in some embodiments the primer layers can have a thickness of 2 to 1000 µm (0.08 to 40 mil), or 2 to 100 µm (0.08 to 4 mil).

The invention is further illustrated by the following examples, which are non-limiting.

EXAMPLES

Several silicone formulations were prepared. In general, the components listed for each formulation listed were mixed and underwent a first curing step to form a semi-cured composition. If desired, a second curing step was performed to form a cured composition. The semi-cured and cured compositions were analyzed to measure various composition characteristics.

Example A

Comparative Formulation

The formulation listed in Table 1 was prepared and cured according to the procedure above.

TABLE 1

| Component description | Supplier name | Supplier Designation | CAS Number | Nominal parts by weight |
|---|---|---|---|---|
| Methyl vinyl silicone base | MPM | Silplus 50MP | 68083-18-1 | 100 |
| 2,4-Dichlorobenzoyl peroxide dispersion | Akzo Nobel | PD-505 | 133-14-2 | 1.67 |
| Heat Stabilizer | Dow Corning | HT-1 | N/A | 1 |

Example B

Comparative Formulation

The formulation listed in Table 2 was prepared and cured according to the procedure above.

TABLE 2

| Component description | Supplier name | Supplier Designation | CAS Number | Nominal Parts by weight |
|---|---|---|---|---|
| Pt cure silicone | Wacker | Elastosil R-50 | | 100 |
| Pt Catalyst | Wacker | Elastosil AUX PT1 | N/A | 1.5 |
| Heat Stabilizer | Dow Corning | HT-1 | N/A | 1 |

Example C

Comparative Formulation

The formulation listed in Table 3 was prepared and cured according to the procedure above.

TABLE 3

| Component description | Supplier name | Supplier Designation | CAS Number | Nominal Parts by weight |
|---|---|---|---|---|
| Pt cure silicone | Wacker | Elastosil R-50 | | 100 |
| Pt Catalyst | Wacker | Elastosil AUX PT1 | N/A | 1.5 |
| Silicone hydride-containing crosslinker | Dow Corning | XL2 | N/A | 0.8 |
| Heat Stabilizer | Dow Corning | HT-1 | N/A | 1 |

Example D

Silicone Formulation

A formulation having a composition listed in Table 4 was prepared and cured according to the procedure above.

TABLE 4

| Component description | Supplier name | Supplier Designation | CAS Number | Parts by weight range |
|---|---|---|---|---|
| Methyl vinyl silicone base | BlueStar | MF940U | 68083-18-1 | 100 |

TABLE 4-continued

| Component description | Supplier name | Supplier Designation | CAS Number | Parts by weight range |
|---|---|---|---|---|
| Pt Catalyst Dispersion | Wacker | Elastosil AUX PT1 | N/A | 0.5-5 |
| 2,4-Dichlorobenzoyl peroxide dispersion | Akzo Nobel | PD-50S | 133-14-2 | 0.2-5 |
| Silicone hydride-containing crosslinker | Dow Corning | XL2 | N/A | 0.05-10 |
| Heat Stabilizer | Dow Corning | HT-1 | N/A | 0.05-10 |

Primer/Dispersion Examples

Example primer/dispersion formulations are listed in Tables 5-7.

Example E

Comparative Example

A formulation having a composition listed in Table 5 was prepared. The formulation was then tested. The formulation did not provide a desired cured bond strength.

TABLE 5

| Component description | Supplier name | Supplier Designation | CAS Number | Nominal Parts by weight allowable range |
|---|---|---|---|---|
| Vinyl Silicone | Dow Corning | RBB-2390-30 | 68083-18-1 | 100 |
| 2,4-Dichlorobenzoyl peroxide | Akzo Nobel | PD-50S | 133-14-2 | 1-5 |
| Vinyltris(2-methoxyethoxy)silane | EVONIK | Dynasylan VTMOEO | 1067-53-4 | 2-20 |
| Xylene | | | 1330-20-7 | 200-2000 |

Example F

Comparative Example

A formulation having a composition listed in Table 6 was prepared. The formulation was then tested. The formulation provided a desired cured bond strength, but the formulation did not provide sufficient uncured bond strength for subsequent manufacturing.

TABLE 6

| Component description | Supplier name | Supplier Designation | CAS Number | Nominal Parts by weight allowable range |
|---|---|---|---|---|
| Vinyl Silicone | Dow Corning | RBB-2390-30 | 68083-18-1 | 100 |
| 2,4-Dichlorobenzoyl peroxide | Akzo Nobel | PD-50S | 133-14-2 | 1-5 |
| Vinyltris(2-methoxyethoxy)silane | EVONIK | Dynasylan VTMOEO | 1067-53-4 | 2-20 |
| Isopropyl alcohol | | | 67-63-0 | 1-100 |
| Water | | | 7732-18-5 | 1-20 |
| Xylene | | | 1330-20-7 | 200-2000 |

Example G

Primer Formulation

A formulation having a composition listed in Table 7 was prepared. The formulation demonstrated a desired cured and uncured bond strength.

TABLE 7

| Component description | Supplier name | Supplier Designation | CAS Number | Nominal Parts by weight allowable range |
|---|---|---|---|---|
| Vinyl Silicone | Dow Corning | RBB-2390-30 | 68083-18-1 | 100 |
| Pt Catalyst | Wacker | Elastosil AUX PT1 | N/A | 1-10 |
| 2,4-Dichlorobenzoyl peroxide | Akzo Nobel | PD-50S | 133-14-2 | 1-5 |
| Vinyltris(2-methoxyethoxy)silane | EVONIK | Dynasylan VTMOEO | 1067-53-4 | 2-20 |
| Isopropyl alcohol | | | 67-63-0 | 1-100 |
| Water | | | 7732-18-5 | 1-20 |
| Xylene | | | 1330-20-7 | 200-2000 |
| Silicone hydride fluid | Dow Corning | XIAMEIER ® MHX-1107 FLUID 3005 | | 1-100 |

Set forth below are specific embodiments of dual temperature curable silicone compositions, methods of partially or fully curing the silicone compositions, and methods of forming articles.

Embodiment 1

A dual temperature curable silicone composition, comprising:
   100 parts by weight of a vinyl silicone;
   0.05-10 parts by weight of a silicone hydride-containing crosslinker;
   0.5-5 parts by weight of a platinum-containing catalyst; and
   0.2-5 parts by weight of a peroxide catalyst.

Embodiment 2

The composition of Embodiment 1, wherein the vinyl silicone is of Formula (I):

$$R^B[Si(R^1R^2)-O]-[(Si(R^3R^4)-O)]_n-[Si(R^5R^6)-O)]_m-Si(R^1R^2)-R^A \quad \text{(Formula I)}$$

wherein
   n has an average value of 1 to 200, preferably 50 to 150, more preferably 100 to 150;
   m is 0 or has an average value of 1 to 20,000, preferably 10,000 to 20,000, more preferably 10,000 to 15,000;

$R^A$, $R^B$, $R^1$, $R^2$, $R^3$, $R^4$, $R^5$ and $R^6$ are each independently a $C_1$-$C_6$ alkyl group; and at least one of $R^A$, $R^B$, $R^3$ and $R^4$ has the formula —CH=$CR^FR^G$, where $R^F$ and $R^G$ are each independently hydrogen or a $C_1$-$C_6$ alkyl group.

Embodiment 3

The composition of Embodiment 2, wherein at least one of $R^A$, $R^B$, $R^3$ and $R^4$ is —CH=$CH_2$.

Embodiment 4

The composition of Embodiment 2, wherein at least one of $R^A$ or $R^B$ is —CH=$CH_2$.

Embodiment 5

The composition of Embodiment 4, wherein $R^1$ and $R^2$ are both methyl groups.

Embodiment 6

The composition of any one or more of the preceding Embodiments, wherein the vinyl silicone comprises a polydiorganosiloxane functionalized with a terminal —Si(Me)$_2$-CH=$CH_2$ group.

Embodiment 7

The composition of any one or more of the preceding Embodiments, wherein the vinyl silicone comprises a dimethylvinyl-terminated dimethylsiloxane.

Embodiment 8

The composition of any one or more of the preceding Embodiments, wherein the silicone hydride-containing crosslinker is of Formula (II):

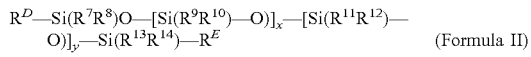

(Formula II)

wherein at least one of $R^D$, $R^E$, $R^7$, $R^8$, $R^9$, $R^{10}$, $R^{11}$, $R^{12}$, $R^{13}$ and $R^{14}$ is hydrogen, and the others of $R^D$, $R^E$, $R^7$, $R^8$, $R^9$, $R^{10}$, $R^{11}$, $R^{12}$, $R^{13}$ and $R^{14}$ are each independently hydrogen, or C1-C6 alkyl;

x has an average value of 1 to 300, preferably 100 to 300, more preferably 150 to 250;

y is 0 or has an average value of 1 to 300, preferably 100 to 300, more preferably 150 to 250.

Embodiment 9

The composition of Embodiment 8, wherein both of $R^D$ and $R^E$ are hydrogen and $R^7$, $R^8$, $R^9$, $R^{10}$, $R^{11}$, $R^{12}$, $R^{13}$ and $R^{14}$ are methyl.

Embodiment 10

The composition of Embodiment 8, wherein y is 0; both of $R^D$ and $R^E$ are methyl; $R^9$ is hydrogen and $R^7$, $R^8$, $R^9$, $R^{10}$, $R^{11}$, $R^{12}$, $R^{13}$ and $R^{14}$ are methyl.

Embodiment 11

The composition of Embodiment 8, wherein both of $R^D$ and $R^E$ are methyl; $R^9$ is hydrogen and $R^7$, $R^8$, $R^9$, $R^{10}$, $R^{11}$, $R^{12}$, $R^{13}$ and $R^{14}$ are methyl.

Embodiment 12

The composition of any one or more of the preceding Embodiments, wherein the silicone hydride-containing crosslinker comprises two or more silicon-bonded hydrogen atoms.

Embodiment 13

The composition of any one or more of the preceding Embodiments, wherein the platinum-containing catalyst comprises a Pt(0) complex, a Pt(II) complex, a Pt(IV) complex, or a combination comprising at least one of the foregoing.

Embodiment 14

The composition of any one or more of the preceding Embodiments, wherein the peroxide catalyst comprises an organic peroxide; an aliphatic peroxide; an aromatic peroxide; an organic hydroperoxide; or a combination comprising at least one of the foregoing.

Embodiment 15

The composition of Embodiment 14, wherein the peroxide catalyst comprises benzoyl peroxide; di-t butyl peroxide; 2,4-dichlorobenzoyl peroxide; or 2,5-bis(t-butylperoxy)-2,5-dimethylhexane.

Embodiment 16

The composition of Embodiment 15, wherein the peroxide catalyst is 2,4-dichlorobenzoyl peroxide.

Embodiment 17

The composition of any one or more of the preceding Embodiments, wherein the platinum-containing catalyst and peroxide catalyst are present in a weight percent ratio of 0.001:1 to 1:1.

Embodiment 18

The composition of any one or more of the preceding Embodiments, further comprising a solvent.

Embodiment 19

The composition of any one or more of the preceding Embodiments, further comprising an additive, preferably a heat stabilizer.

Embodiment 20

A method of fully curing a dual temperature curable silicone composition, comprising:
providing a silicone composition of any one or more of the preceding Embodiments;
exposing the silicone composition to a first temperature to activate the platinum catalyst but not the peroxide catalyst, to form a semi-cured composition; and heating the semi-cured composition to a second temperature sufficient to activate the peroxide catalyst, to form a fully cured composition.

Embodiment 21

The method of Embodiment 20, wherein the first temperature is below 100° C., and the second temperature is 70° C. to 200° C., provided that the second temperature is higher than the first temperature.

Embodiment 22

The method of any one or more of Embodiments 20 to 21, further comprising forming the semi-cured or fully cured silicone composition into a desired shape.

Embodiment 23

A fully-cured silicone composition, made by the method of any one or more of Embodiments 20 to 22.

Embodiment 24

A method of semi-curing a dual temperature curable silicone composition, comprising:
providing a dual temperature curable silicone composition comprising a vinyl silicone; a silicone hydride-containing crosslinker; a platinum-containing catalyst; and a peroxide catalyst;
exposing the silicone composition to a first temperature to activate the platinum catalyst but not the peroxide catalyst to form a semi-cured composition.

Embodiment 25

The method of Embodiment 24, wherein the first temperature is below 100° C., preferably below 50° C., or 21° C. to 25° C.

Embodiment 26

The method of any one or more of Embodiments 24 to 25, further comprising forming the curable composition or the semi-cured composition into a desired shape.

Embodiment 27

A semi-cured silicone composition, made by the method of any one or more of Embodiments 24 to 25.

Embodiment 28

The composition of Embodiment 23 or 27, wherein the composition provides adhesion to a substrate.

Embodiment 29

A method of forming a semi-cured article comprising:
providing the silicone composition of any one or more of Embodiments 1 to 19;
exposing the uncured composition to a first temperature to activate the platinum catalyst but not the peroxide catalyst, to provide a semi-cured composition; and
shaping the semi-cured composition to provide a shaped, semi-cured article.

Embodiment 30

A method of forming a semi-cured article comprising:
shaping the silicone composition of any one or more of Embodiments 1 to 19; and
exposing the shaped uncured composition to a first temperature to activate the platinum catalyst but not the peroxide catalyst, to provide a shaped, semi-cured article.

Embodiment 31

A method of forming an article comprising:
providing the silicone composition of any one or more of Embodiments 1 to 19;
exposing the uncured composition to a first temperature to activate the platinum catalyst but not the peroxide catalyst, to provide a semi-cured composition;
shaping the semi-cured composition to provide a semi-cured article; and
heating the semi-cured composition to a second temperature sufficient to activate the peroxide catalyst, to form a fully cured article.

Embodiment 32

A method of forming an article comprising:
shaping the silicone composition of any one or more of Embodiments 1 to 19 to form an uncured article;
exposing the uncured article to a first temperature to activate the platinum catalyst but not the peroxide catalyst, to provide a semi-cured article; and
heating the semi-cured article to a second temperature sufficient to activate the peroxide catalyst, to form a fully cured article.

Embodiment 33

The method of any one or more of Embodiments 29 to 32, wherein the first temperature is below 100° C., and the second temperature is 70° C. to 200° C., provided that the second temperature is higher than the first temperature.

Embodiment 34

The method of any one or more of Embodiments 29 to 33, wherein the shaping comprises casting or calendering to form a layer.

Embodiment 35

The method of any one or more of Embodiments 29 to 34, further comprising forming the layer on a substrate, wherein the substrate has been treated with a primer, preferably a vinyl tris(alkoxyalkoxy)silane.

Embodiment 36

The method of Embodiment 35, wherein the vinyl tris (alkoxyalkoxy)silane is present in an amount of 2-20 parts by weight.

Embodiment 37

The method of Embodiment 36, wherein the vinyl tris (alkoxyalkoxy)silane is vinyl tris[($C_1$-$C_6$ alkoxy $C_1$-$C_6$ alkoxy)]silane.

Embodiment 38

The method of Embodiment 37, wherein the vinyl tris(alkoxyalkoxy)silane is vinyl tris(2-methoxyethoxy) silane.

Embodiment 39

The method of any one or more of Embodiments 29 to 38, wherein the second temperature is achieved by laminating the article.

In general, the invention may alternatively comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, unless otherwise specified, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments. The endpoints of all ranges directed to the same component or property are inclusive of the endpoints, are independently combinable, and include all intermediate points and ranges. Unless defined otherwise, technical and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means branched or straight chain, unsaturated $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC=$CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated divalent aliphatic hydrocarbon group (e.g., methylene (—$CH_2$—) or propylene (—($CH_2$)$_3$—)). "Substituted" means that the compound or group is substituted with at least one (e.g., 1, 2, 3, or 4) substituents independently selected from a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of fully curing a dual temperature curable silicone composition to form an article, the method comprising:
   providing a silicone composition, wherein the silicone composition comprises:
   100 parts by weight of a vinyl silicone of Formula I

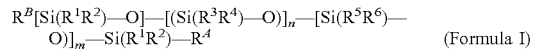
(Formula I)

wherein
   n has an average value of 1 to 200,
   m has an average value of 5,000 to 20,000,
   $R^A$, $R^B$, $R^1$, $R^2$, $R^3$, $R^4$, $R^5$ and $R^6$ are each independently a $C_1$-$C_6$ alkyl group; and
   at least one of $R^A$, $R^B$, $R^3$ and $R^4$ has the formula —CH=$CR^FR^G$, where $R^F$ and $R^G$ are each independently hydrogen or a $C_1$-$C_6$ alkyl group;
   0.05-10 parts by weight of a silicone hydride-containing crosslinker;
   a platinum-containing catalyst; and
   0.2-5 parts by weight of a peroxide catalyst, wherein the platinum-containing catalyst and peroxide catalyst are present in a weight percent ratio of 0.001:1 to 0.01:1;
   shaping the silicone composition to provide a shaped silicone composition;
   exposing the shaped silicone composition to a first temperature to activate the platinum catalyst but not the peroxide catalyst, to form a shaped, semi-cured, article; and
   heating the shaped, semi-cured article to a second temperature sufficient to activate the peroxide catalyst, to form a fully cured article.

2. The method of claim 1, further comprising storing the shaped, semi-cured article for a period of time before heating to the second temperature.

3. The method of claim 1, further comprising repositioning the shaped, semi-cured article before heating to the second temperature.

4. The method of claim 1, wherein the shaping comprises casting or calendering the silicone composition to form a layer.

5. The method of claim 4, comprising forming the layer on a substrate to provide an article comprising the shaped, semi-cured, article disposed on the substrate.

6. The method of claim 5, wherein heating the shaped, semi-cured, article disposed on the substrate to the second temperature forms a fully cured article wherein the fully cured article is laminated to the substrate.

7. The method of claim 1, wherein the first temperature is below 100° C., and the second temperature is 70° C. to 200° C., provided that the second temperature is higher than the first temperature.

8. The method of claim 7, wherein the first temperature is below 50° C.

9. The method of claim 7, wherein the first temperature is 21° C. to 25° C.

10. The method of claim 7, wherein the first temperature is below 50° C. and the second temperature is 100° C. to 250° C.

11. The method of claim 1, wherein at least one of $R^A$, $R^B$, $R^3$ and $R^4$ is —CH=CH$_2$.

12. The method of claim 1, wherein at least one of $R^A$ or $R^B$ is —CH=CH$_2$ and $R^1$ and $R^2$ are both methyl groups.

13. The method of claim 1, wherein
the vinyl silicone comprises a polydiorganosiloxane functionalized with a terminal —Si(Me)$_2$-CH=CH$_2$ group; and
the silicone hydride-containing crosslinker is of Formula (II):

$$R^D\text{—Si}(R^7R^8)\text{O—[Si}(R^9R^{10})\text{—O)]}_x\text{—[Si}(R^{11}R^{12})\text{—O)]}_y\text{—Si}(R^{13}R^{14})\text{—}R^E \quad \text{(Formula II)}$$

wherein
at least one of $R^D$, $R^E$, $R^7$, $R^8$, $R^9$, $R^{10}$, $R^{11}$, $R^{12}$, $R^{13}$ and $R^{14}$ is hydrogen, and the others of $R^D$, $R^E$, $R^7$, $R^8$, $R^9$, $R^{10}$, $R^{11}$, $R^{12}$, $R^{13}$ and $R^{14}$ are each independently hydrogen, or $C_1$-$C_6$ alkyl;

x has an average value of 1 to 300; and
y is 0 or has an average value of 1 to 300.

14. The method of claim 13, wherein both of $R^D$ and $R^E$ are hydrogen and $R^7$, $R^8$, $R^9$, $R^{10}$, $R^{11}$, $R^{12}$, $R^{13}$, and $R^{14}$ are methyl.

15. The method of claim 14, wherein y is 0; both of $R^D$ and $R^E$ are methyl; $R^9$ is hydrogen and $R^7$, $R^8$, $R^{10}$, $R^{13}$, and $R^{14}$ are methyl.

16. The method of claim 14, wherein both of $R^D$ and $R^E$ are methyl; $R^9$ is hydrogen and $R^7$, $R^8$, $R^{10}$, $R^{11}$, $R^{12}$, $R^{13}$ and $R^{14}$ are methyl.

17. The method of claim 1, wherein
the platinum-containing catalyst comprises a Pt(0) complex, a Pt(II) complex, a Pt(IV) complex, or a combination comprising at least one of the foregoing; and
the peroxide catalyst comprises an organic peroxide; an aliphatic peroxide; an aromatic peroxide; an organic hydroperoxide; or a combination comprising at least one of the foregoing.

18. A shaped, fully cured article made by the method of claim 1.

* * * * *